(12) United States Patent
Casel

(10) Patent No.: US 7,328,903 B2
(45) Date of Patent: Feb. 12, 2008

(54) CHUCK

(75) Inventor: Herbert Casel, Wuppertal (DE)

(73) Assignee: Robert Schröder GmbH & Co. KG, Wuppertal (DE)

( * ) Notice: Subject to any disclaimer, the term of this patent is extended or adjusted under 35 U.S.C. 154(b) by 0 days.

(21) Appl. No.: 10/905,702

(22) Filed: Jan. 18, 2005

(65) Prior Publication Data
US 2005/0161889 A1 Jul. 28, 2005

(30) Foreign Application Priority Data
Jan. 23, 2004 (DE) .................. 10 2004 003778

(51) Int. Cl.
*B23B 31/20* (2006.01)

(52) U.S. Cl. .................. 279/43; 279/46.1; 279/51

(58) Field of Classification Search .................. 279/43, 279/46.1, 51–53, 43.1, 43.2, 43.6, 46.2, 46.3, 279/46.6, 50
See application file for complete search history.

(56) References Cited

U.S. PATENT DOCUMENTS

| | | | |
|---|---|---|---|
| 668,286 A * | 2/1901 | Freese | 279/43 |
| 703,229 A * | 6/1902 | Boman | 279/43 |
| 930,695 A * | 8/1909 | Royle | 451/378 |
| 975,408 A * | 11/1910 | Fry | 451/381 |
| 1,227,632 A * | 5/1917 | Lagerback | 279/42 |
| 2,210,993 A * | 8/1940 | Weatherhead, Jr. | 228/161 |
| 2,545,610 A * | 3/1951 | Evans | 279/50 |
| 2,545,628 A * | 3/1951 | O'Connell | 279/50 |
| 3,292,939 A * | 12/1966 | Lorenz | 279/50 |
| 3,802,713 A * | 4/1974 | Levy | 279/50 |
| 4,395,051 A * | 7/1983 | Tonomura | 279/75 |
| 4,681,056 A * | 7/1987 | Friedle et al. | 114/146 |
| 4,799,838 A * | 1/1989 | Kubo et al. | 409/234 |
| 5,253,556 A * | 10/1993 | Kelly et al. | 81/53.2 |
| 5,810,366 A * | 9/1998 | Montjoy et al. | 279/43 |
| 5,820,136 A * | 10/1998 | Han et al. | 279/131 |
| 5,947,484 A * | 9/1999 | Huggins et al. | 279/43.4 |
| 5,947,485 A * | 9/1999 | Nguyen | 279/46.2 |
| 5,951,024 A * | 9/1999 | Montjoy et al. | 279/43 |
| 6,135,462 A * | 10/2000 | Robison | 279/137 |
| 6,234,491 B1 * | 5/2001 | Wheeler | 279/143 |
| 6,343,901 B2 * | 2/2002 | Wheeler et al. | 408/239 R |
| 6,575,477 B2 * | 6/2003 | Humphrey et al. | 279/46.7 |
| 6,908,085 B2 * | 6/2005 | Gerber | 279/43.1 |
| 2005/0087936 A1* | 4/2005 | Dunner | 279/43 |

FOREIGN PATENT DOCUMENTS

JP 55031516 A * 3/1980 .................. 279/43

* cited by examiner

*Primary Examiner*—Monica Carter
*Assistant Examiner*—Michael W. Talbot
(74) *Attorney, Agent, or Firm*—Gudrun E. Huckett

(57) ABSTRACT

A chuck has an attachment device for attaching the chuck to a machine spindle and a collet with clamping jaws defining an insertion opening at an end of the chuck opposite the attachment device. A sliding sleeve surrounds the clamping jaws and is axially moveable into a clamping position for clamping a machining tool inserted into the insertion opening and into a release position for releasing the tool. Between an inner circumference of the sliding sleeve and an outer circumference of the clamping jaws a contact path conically tapering in an axial direction and counter pressure members that engage positively the contact path are provided. The contact path is positioned at a slant relative to the axial longitudinal center of the collet. The slant angle is so small that under expected operating forces a self-locking action between contact path and counter pressure members is maintained at all times.

28 Claims, 3 Drawing Sheets

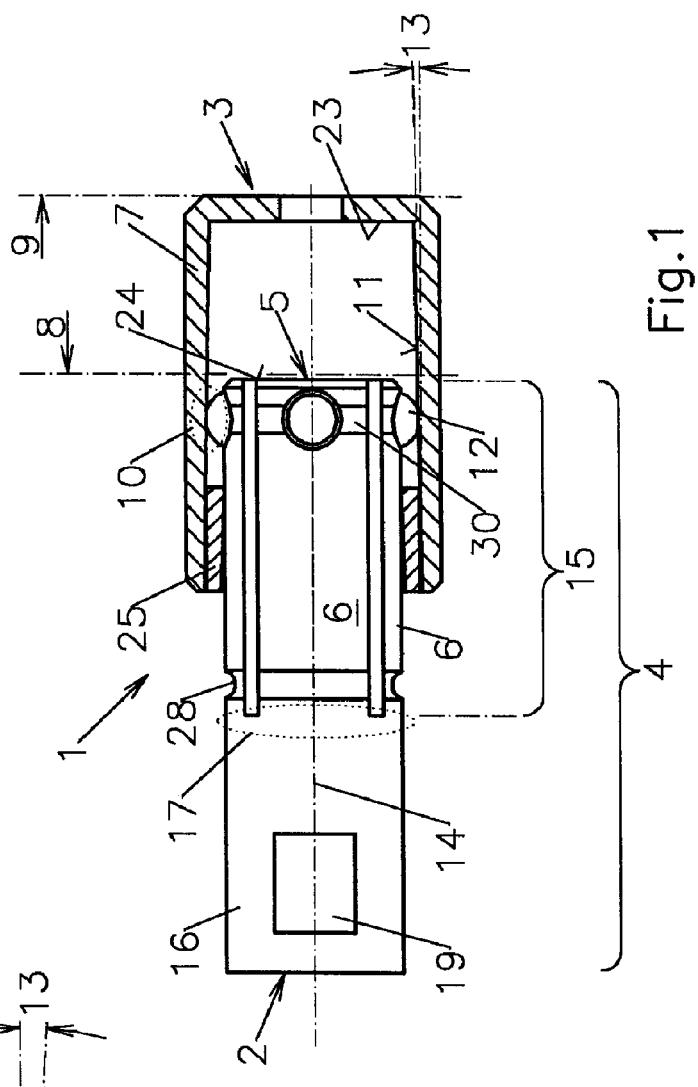
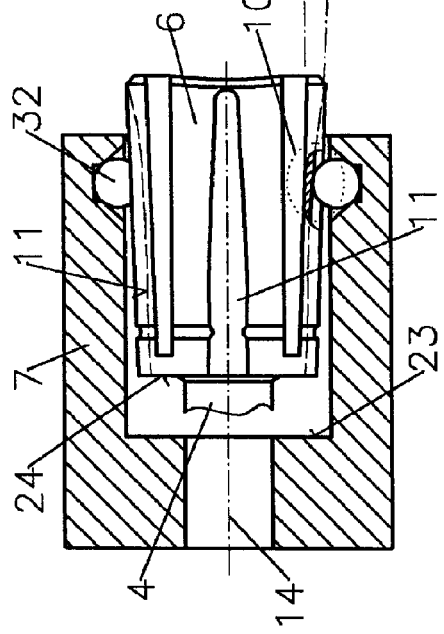
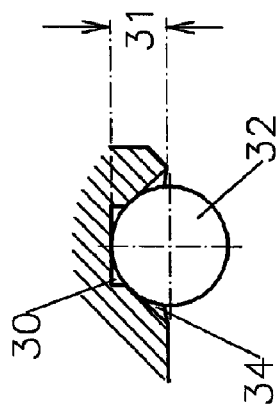

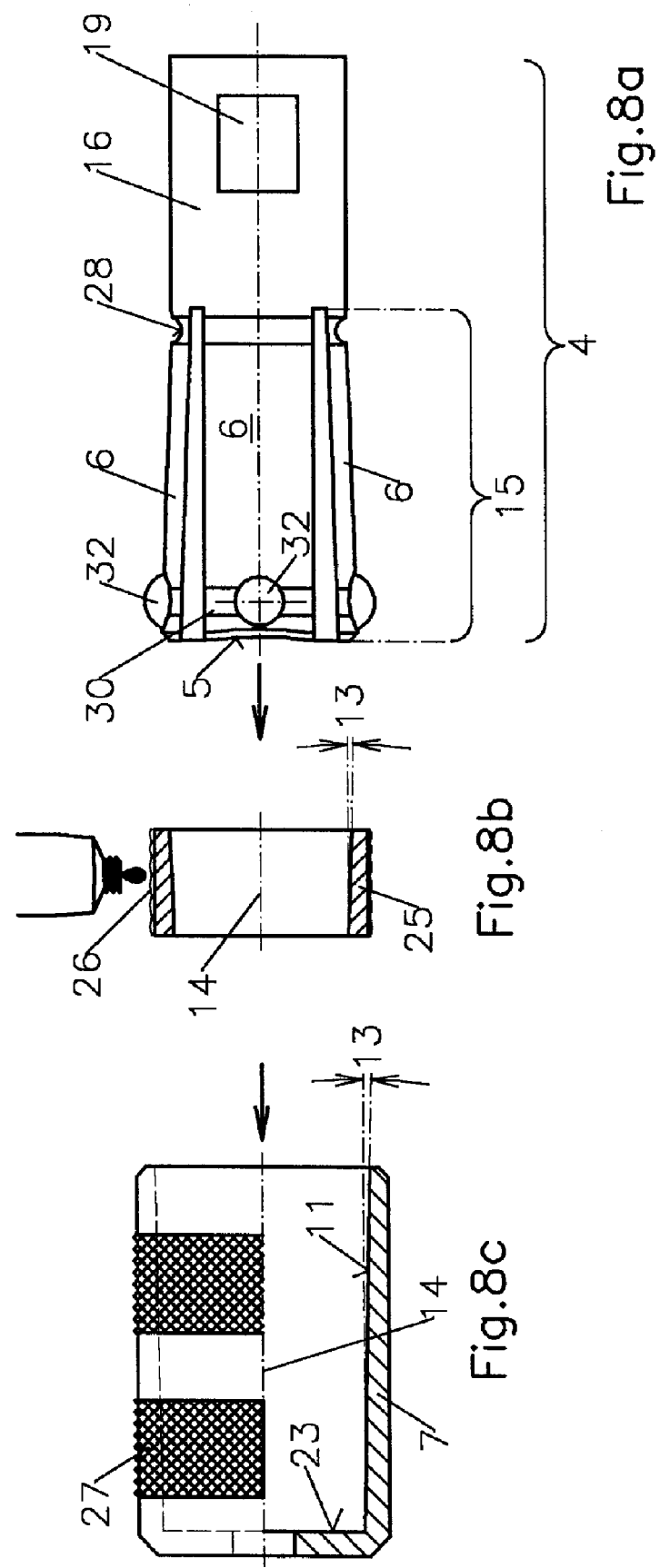

CHUCK

BACKGROUND OF THE INVENTION

The invention relates to a chuck with an attachment device for mounting on a motor-driven machine spindle.

Such chucks serve for receiving machining tools, for example, grinding wheels, polishing wheels and the like. Such tools have a cylindrical shaft that is inserted into the chuck and subsequently clamped.

In this connection, so-called spindle grinding machines made by well-known manufacturers (Hitachi, Dremel, Proxxon) are known. For inserting and for removing the machining tool, the machine spindle is stopped by means of a spindle locking device. The clamping jaws of the chuck are subsequently released by means of a clamping sleeve that is knurled on its outer circumference, and the machining tool can be removed. The attachment of the machining tool is carried out in reverse order.

However, a chuck of this type that is easier to operate is desirable.

SUMMARY OF THE INVENTION

It is an object of the present invention to provide a chuck for clamping a shaft of a machining tool which chuck can be mounted in the same way as is known in the art on a motor-driven machine spindle and, at the same time, enables with a single manipulation step movement from the clamping position into the release position and vice versa.

In accordance with the present invention, this is achieved in that the chuck, comprising an attachment device for attaching the chuck on a motor-driven machine spindle, comprises a collet that is open in a direction toward an axial end facing away from the attachment device, wherein the clamping jaws of the collet are surrounded by a sliding sleeve that, for clamping the shaft of a machining tool, is moved in a predetermined axial direction into a clamping position and from this clamping position is movable into a release position, wherein for this purpose between the inner circumference of the sliding sleeve and the outer circumference of the clamping jaws a mating pressure zone pair is provided that is comprised of a contact path conically tapering in an axial direction and of counter pressure members that engage positively the contact path and wherein the contact path is positioned at such a small slant angle relative to the axial longitudinal center of the collet that under the operating forces to be expected a self-locking action between contact path and counter pressure member is maintained at all times.

An important feature of the present invention is that the sliding sleeve practically can be moved back and forth on the outer circumference of the collet in the axial direction, i.e., parallel to the axial direction of the chuck, and that the sliding sleeve in at least one predetermined position moves the clamping jaws into their clamping position.

Because the clamping jaws are advanced by the axially movable sliding sleeve in the direction toward the axial longitudinal center of the collet, they approach, only by means of the axial movement of the sliding sleeve, the outer circumference of the inserted shaft of the machining tool to such an extent that the inner walls of the clamping jaws provide clamping of the shaft of the tool so as to ensure a secure driving action.

In this connection, it is important to realize that between the inner circumference of the sliding sleeve and the outer circumference of the clamping jaws or the collet no thread-based engagement is required. The required clamping action results exclusively from the positive engagement between the inner circumference of the sliding sleeve and the outer circumference of the clamping jaws, on the one hand, and the inner circumference of the clamping jaws and the outer circumference of the inserted shaft of the machining tool, on the other hand.

The mating pressure zone pair between sliding sleeve and clamping jaws is comprised of a contact path that tapers slightly conically in the axial direction, wherein the contact path is arranged either on the sliding sleeve or the clamping jaws and extends essentially only in the axial direction of the chuck. A thread-like pitch is not detrimental with regard to the invention (for example, a pitch of approximately up to 0.5 windings per cm travel stroke between clamping position and release position).

The minimal slant of the contact path relative to the axial longitudinal center of the clamping jaws results under all expected operating forces always in a self-locking action between the contact path and the counter pressure members so that the chuck will not release accidentally even at high rpm of the machine spindle.

The counter pressure members, depending on the arrangement of the contact path, can be provided either on the inner circumference of the sliding sleeve or the outer circumference of the clamping jaws. It is recommended to configure the counter pressure members in the form of rolling elements which are mounted in fixedly predetermined recesses of the sliding sleeve or of the clamping jaws.

The special advantage of the invention resides in that by means of the axial movement of the sliding sleeve alone a machine-correlated spindle locking device is no longer required. For example, if the contact path is slightly slanted for safety considerations so that under the forces of inertia that occur during rotation of the machine spindle a locking action is forcedly provided, there is in this connection also no need for a locking device for the machine spindle because, as a result of the primarily axial movement of the sliding sleeve, the winding contour of the contact path must be followed also.

Advantageously, the collet is hollow and tubular at least in the longitudinal area of the clamping jaws and the clamping jaws are connected as unitary parts to the socket of the collet.

Such a collet is generally known in the art in the form of a changer collet to be inserted into the chuck, this embodiment is however of special importance in connection with the inventive feature that the socket of the collet supports also the attachment device for the machine spindle.

Such a chuck therefore does not require a separate housing and the machine spindle can be provided in a simple way at its end with an outer thread that can be screwed into a matching inner thread of the socket of the collet.

Advantageously, the sliding sleeve has two end positions that are defined by stops. Embodiments are provided for this configuration.

Based on the radial advancing of the clamping zones of the clamping jaws relative to be inserted tool shaft, it is recommended to elastically pretension the clamping jaws relative to the axial longitudinal center in a radial outward direction.

In this way, the tool shaft can be inserted in a simple way into the terminal bore (insertion opening) of the clamping jaws; subsequently, by movement of the sliding sleeve, the clamping jaws are advanced in the direction of the tool shaft such that, as desired, a positive clamping action as well as a frictional clamping action by frictional forces results between the inner circumference of the sliding sleeve, the mating pressure zone pair between sliding sleeve and clamping jaws, and the positive engagement of the clamping jaws on the tool shaft.

In this connection, the Hertzian pressures between the mating pressure zone pair and the tool shaft also play a role because the Hertzian pressures additionally make an accidental release of the chuck more difficult as a result of the minimal local deformations between the respective contacting partners.

The invention therefore is also based on the recognition that, by means of a minimal slant of the contact path relative to the axial longitudinal center of the chuck, high radial forces are generated already with minimal axial forces, wherein the radial forces, in the end, also lead to high Hertzian pressures between the interacting components.

In this way, in addition to purely frictional forces, the deformations of the interacting contact partners must be taken into consideration also for the evaluation of the self-locking action.

The radial elastic pretension of the clamping jaws in the outward direction can be easily achieved by a circumferential groove that is provided on the collet in the area of the connection between the socket of the collet and the clamping jaws.

This embodiment takes into account that such a collet is comprised particularly advantageously of hardened material. Accordingly, for the manufacture of the collet a hard-enable material is used that, provided the circumferential groove as discussed above is present, must be heat-treated before it is subjected to the hardening process. When heating the green body, the clamping jaws will spread radially outwardly because of the circumferential groove, and will prevent an axial rattling of the sliding sleeve in this way.

When the counter pressure members are formed by rolling elements, for example, ball bearing balls, it is in addition beneficial to connect the recesses for the rolling elements with one another by means of a circumferential groove on the collet.

In this connection, the depth of the circumferential groove should also determine the depth of the recesses.

In this way, the rolling elements all project by the same amount outwardly past the clamping jaws and therefore rest with the same force against their pressure zone partners.

This measure simplifies thus the manufacture inasmuch as the depth of the recesses for the rolling elements is made uniform for all recesses by means of the circumferential groove.

In addition to the purely mathematically determined angles, in particular those slant angles are to be considered that, relative to the axial longitudinal center, are within a range of approximately 0.1 to 5 degrees and even more particular within a range of 0.1 degree to 1 degree.

In practice, slant angles between 0.6 to 0.75 degrees have delivered excellent results.

The special advantage of the invention resides in that such a chuck in principle is comprised of only two components, i.e., a monolithic collet combined with a sliding sleeve.

In this connection, the practical use of the chuck can be enhanced when it is comprised only of a monolithic (unitary) collet, a sliding sleeve with a locking member, and a counter pressure member in the form of a rolling element for each clamping jaw.

BRIEF DESCRIPTION OF THE DRAWING

FIG. 1 is a first embodiment of the invention.
FIG. 2 is a second embodiment of the invention.
FIG. 3 is a detail view of a rolling element in a circumferential groove intercepted by a recess.
FIGS. 8a to 8c illustrate mounting of an advantageous embodiment of a chuck according to the invention.

DESCRIPTION OF THE PREFERRED EMBODIMENTS

Figure 4:
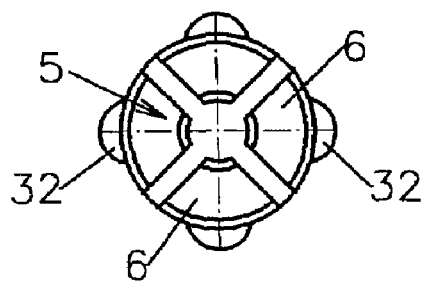
FIG. 4 is a plan view onto the head of the collet.
Figure 5:
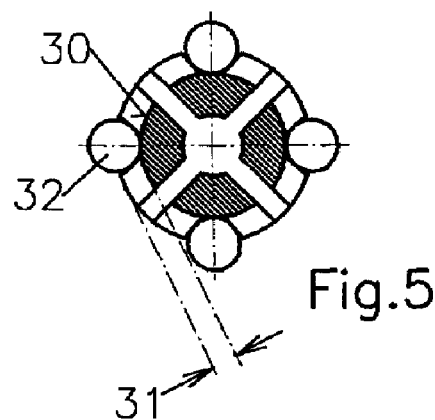
FIG. 5 is a view of the collet according to FIG. 4 in the plane of the rolling elements.

If nothing else is mentioned, the following description applies to all of the Figures.

The Figures show a chuck 1 with an attachment device 2 for mounting the chuck on a motor-driven machine spindle 33.

The chuck 1 comprises a collet 4 that is open in a direction toward the axial end 3 of the chuck 1 that is facing away from the attachment device 2. The collet 4 is of a monolithic configuration and has an open axial end 5 facing away from the machine spindle 33. The open axial end 5 has an insertion opening for a tool shaft (not shown).

The collet 4 is comprised of individual clamping jaws 6 that, after the tool shaft has been inserted, must be advanced in the direction toward the axial longitudinal center 14 in order to secure the tool shaft so as to be axially and circumferentially immobile within the collet 4.

For this purpose, a sliding sleeve 7 is provided that surrounds the individual clamping jaws 6 on their outer side. For clamping the shaft of the machining tool, the sliding sleeve 7 is moved in a predetermined axial direction into a clamping position 8.

In the embodiment according to FIG. 1, the sliding sleeve 7 is moved in the direction toward the machine spindle 33 while in the embodiment according to FIG. 2 the sliding sleeve 7 is moved in the direction to the axial right end of the collet 4. It is therefore inconsequential for the function of the invention whether the predetermined axial direction for reaching the clamping position 8 is provided in the direction of the machine spindle 33 or away from it.

However, advantageous is the configuration according to FIG. 1 because impact on the head of the sliding sleeve 7 from the exterior cannot lead to release of the clamping jaws 6.

It is understood that the sliding sleeve must be movable from the clamping position 8 into a release position 9 in order to be able to exchange the machining tool.

In order to provide a clamping action for the shaft of the machining tool, a mating pressure zone pair 10 is provided between the inner circumference of the sliding sleeve 7 and the outer circumference of the clamping jaws 6. The mating pressure zone pair 10 is comprised of a contact path 11 that tapers conically in the axial direction and counter pressure members 12 that cooperate positive-lockingly with the contact path 11. Contact path and counter pressure members are provided either on the sliding sleeve 7 or the clamping jaws 6, respectively.

It is important that the contact path 11 is slanted relative to the axial longitudinal center 14 of the chuck 1 only at such a small slant angle 13 that under the expected operating forces there is always a locking action maintained between the contact path 11 and the counter pressure member 12.

The FIGS. show a preferred embodiment in which the collet 4 is hollow and tubular at least in the axial longitudinal area 15 of the clamping jaws 6; the clamping jaws 6 are connected as monolithic parts to the socket 16 of the collet 4.

Advantageously, the socket 16 is annular and hollow and supports also the attachment device 2 for the machine spindle 33.

Figure 6:
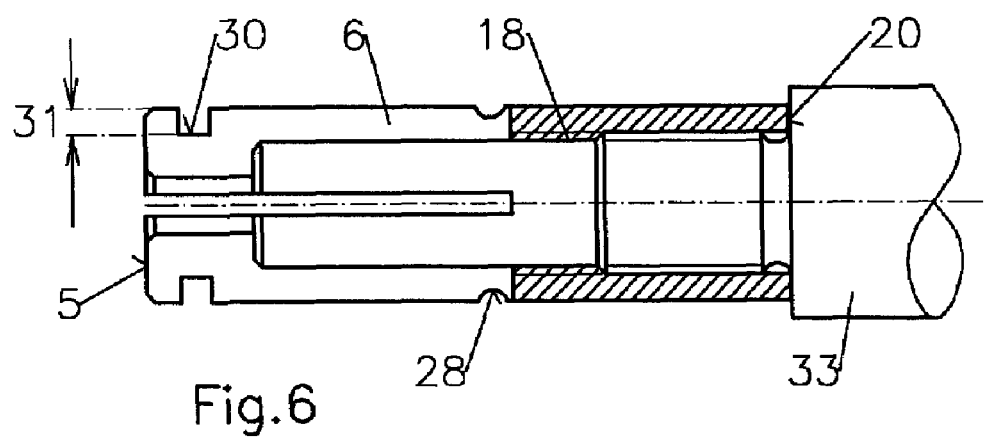
FIG. 6 is an axial section of a collet screwed onto a machine spindle.

In the illustrated embodiment according to FIG. 6, the socket 16 has a threaded bore 18 for this purpose; into the bore 18 a corresponding outer thread of the machine spindle 33 is screwed until it reaches the stop 20.

For releasing the chuck 1, in the area of the socket 16 engagement surfaces 19 for wrenches are provided so that the chuck 1 can be easily exchanged when the machine spindle 33 is locked.

Moreover, the Figures show that the axial movability of the sliding sleeve 7 is limited between two stops. One of the stops is correlated with the clamping position 8 and the other with the release position 9.

In this connection, the stop for the clamping position 8 is formed between the inner end face 23 of the sliding sleeve 7 and the transverse wall 24 of the collet 4 that practically forms the head area of the collet 4. This is illustrated in FIG. 1.

The stop that is effective for the release position 9 results from FIG. 1 in connection with FIGS. 8a to 8c. A locking member 25 in the form of a sleeve is illustrated in FIG. 8b which is attached by an adhesive joint 26 to the inner wall of the sliding sleeve 7.

The end face of the locking member 25 facing the insertion opening of the chuck 1 is arranged on the side of the counter pressure members 12 that faces the attachment device 2 for the machine spindle 33.

As shown in FIG. 1, the locking member 25 cannot be moved to the right past the counter pressure members 12.

The stop suitable for limiting the travel stroke of the sliding sleeve 7 for reaching the release position 9 is therefore formed by the end face of the locking member 25 facing in the direction of the insertion opening in combination with the counter pressure members 12.

Furthermore, the FIGS. 8a through 8c show a preferred connection between the locking member 25 and the inner wall of the sliding sleeve 7. This connection is comprised of an adhesive joint 26 and is therefore not detachable under normal operating conditions.

However, it can also be expedient to provide the sliding sleeve 7 on the outer circumference with a knurled surface 27 in order to improve grip for axial sliding.

In addition, the Figures show a further embodiment in which the clamping jaws 6 relative to the axial longitudinal center 14 are radially elastically pretensioned in the outward direction.

The greatest outer diameter of the clamping jaws 6 at the insertion end of the collet 4 is therefore greater than the greatest inner diameter of the sliding sleeve 7 so that, optionally with the aid of the counter pressure members 12, the clamping jaws always rest elastically and positively against the inner wall of the sliding sleeve 7.

Figure 7:
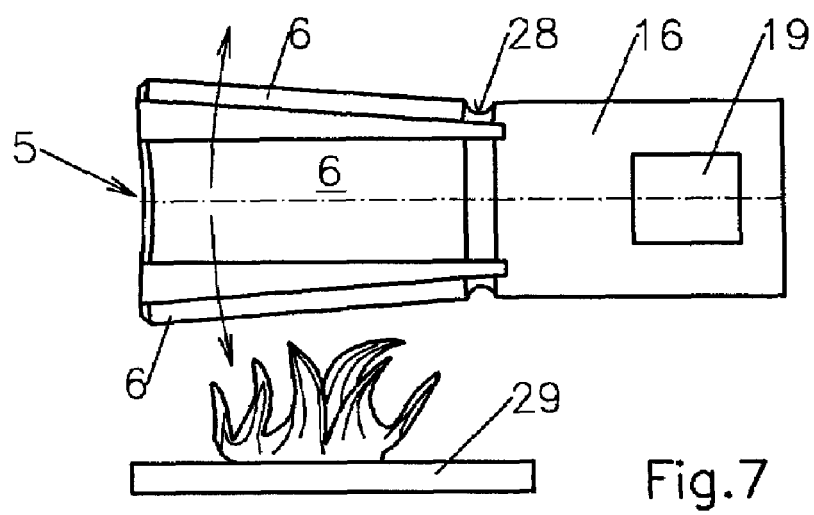
FIG. 7 shows schematically the hardening process of a collet.

For obtaining a radial elastic pretension in the outward direction, the collet 4 in the illustrated embodiment has a circumferential groove 28 in the area of the connecting location 17 between the socket 16 and the clamping jaws 6. As illustrated schematically in FIG. 7, when using a hardenable metal material for the collet 4, the free ends of the clamping jaws widen outwardly during hardening at the connecting location 17 to the socket 16 and remain in this expanded position after the hardening process.

In this connection, the space that is free of material in accordance with the circumferential groove 28 is important: it enables the clamping jaws 6 located at one side of the socket 16 to bend outwardly as a result of heating.

In place of the schematically illustrated hardening by fire 29 it is, of course, also possible to employ other thermal hardening processes.

In place of a thermal hardening process it is also possible to employ surface hardening methods, for example, nitration hardening. In this case, however, it is recommended to adjust the clamping jaws 6 prior to hardening.

The counter pressure members 12 can be provided also as unitary and monolithic parts at the ends of the clamping jaws 6. Advantageously, rolling elements 32 are however employed that are inserted into matching recesses 34 of the clamping jaws 6 (see FIG. 1) or the sliding sleeve 7 (see FIG. 2). The rolling elements are, in particular, ball bearing balls because they exhibit high precision and hardness. They are seated in accordance with FIG. 2 in recesses 34 produced by drilling.

However, in order for the respective insertion depth of the rolling elements 32 in the bores 34 to have identical depth for all rolling elements employed on all clamping jaws 6, a circumferential groove 30 can be provided additionally; the groove 30 connects all bores 34 with one another and has a uniform groove depth 31 about the entire circumference of the collet 4.

In this connection, it is in principle inconsequential whether the rolling elements 32 are movable slightly in the axial direction of the chuck 1. The rotation symmetrical arrangement of the rolling elements 32, the sliding sleeve 7 and the clamping zone on the inner circumference of the clamping jaws 6 provides a uniform surface pressure for all components participating in the positive locking engagement.

This measure therefore improves the concentric running of the device with minimal imbalance and provides a clamping pressure that is uniformly distributed about the shaft of the tool.

The Figures show moreover slant angles 13 that are within a range of approximately 0.1 to 5 degrees, preferably, within the range of 0.1 to 1 degrees. Excellent results can be obtained for slant angles that are between 0.6 to 0.75 degrees.

Such small slant angles 13 lead to a high positive locking pressing action and, in particular, when taking into account the Hertzian pressure, also to elastic deformations of the positively engaging partners, thus resulting in a high self-locking action and therefore high release safety.

Important in connection with the invention is in particular the possibility of building a chuck of only two individual components, i.e., a monolithic collet 4 with clamping jaws and a sliding sleeve 7 surrounding the collet 4. In addition, in the embodiment according to FIGS. 1 and 8, a locking member 25 and counter pressure members 12 in the form of ball bearing balls are provided in the interior of the sliding sleeve 7.

The locking member 25 is embodied in this configuration as a locking sleeve which is inserted in the interior of the sliding sleeve and connected at its outer circumference practically non-detachably to the sliding sleeve 7.

While specific embodiments of the invention have been shown and described in detail to illustrate the inventive principles, it will be understood that the invention may be embodied otherwise without departing from such principles.

What is claimed is:

1. A chuck comprising:
an attachment device adapted to attach the chuck to a motor-driven machine spindle;
a collet connected to the attachment device;
the collet having clamping jaws defining an insertion opening at an axial end face of the chuck facing away from the attachment device;
a sliding sleeve slidably connected to the collet and surrounding the clamping jaws, wherein the sliding sleeve is axially moveable in a first direction into a clamping position for clamping a shaft of a machining tool inserted into the insertion opening and in a second direction from the clamping position into a release position for releasing the shaft;
wherein between an inner circumference of the sliding sleeve and an outer circumference of the clamping jaws a mating pressure zone pair is provided that is comprised of a contact path conically tapering in an axial direction and comprised of counter pressure members that engage positively the contact path;
wherein the contact path is positioned at a slant angle relative to the axial longitudinal center of the collet, wherein the slant angle is so small that under expected operating forces of the chuck a self-locking action between the contact path and the counter pressure members is maintained at all times;
wherein the clamping jaws have an outer circumferential surface that forms the contact path;
wherein the sliding sleeve has an inner circumferential wall and the inner circumferential wall has recesses;
wherein the counter pressure members are arranged in the recesses of the inner circumferential wall of the sliding sleeve; and
wherein the counter pressure members are rolling elements and wherein the recesses have a shape matched to the shape of the counter pressure members.

2. The chuck according to claim 1, comprising a first stop defining the clamping position and a second stop defining the release position.

3. The chuck according to claim 2, wherein the first stop defining the clamping position is a transverse wall of the collet, wherein an end face of the sliding sleeve contacts the transverse wall in the clamping position.

4. The chuck according to claim 1, wherein the collet is comprised of hardened metal.

5. The chuck according to claim 1, wherein the recesses are connected to one another by a circumferential groove.

6. The chuck according to claim 5, wherein a depth of the circumferential groove determines a depth of the recesses.

7. The chuck according to claim 1, wherein the slant angle is within a range of approximately 0.1 to 5 degrees.

8. The chuck according to claim 1, wherein the slant angle is between approximately 0.1 to 1 degrees.

9. The chuck according to claim 1, consisting only of:
the collet, wherein the clamping jaws are monolithic parts of the collet;
the sliding sleeve, wherein the sliding sleeve has a locking member;
wherein each one of the clamping jaws interacts with one of counter pressure members, respectively, wherein the counter pressure members are rolling elements.

10. The chuck according to claim 9, wherein the locking member is a locking sleeve arranged in an interior of the sliding sleeve.

11. The chuck according to claim 1, wherein the collet has a socket and has an axial longitudinal area defined by the clamping jaws, wherein at least in the axial longitudinal area the collet is hollow and tubular, and wherein the clamping jaws are connected as monolithic parts to the socket.

12. The chuck according to claim 1, wherein the clamping jaws relative to an axial longitudinal center of the collet are pretensioned elastically in a radial outward direction.

13. The chuck according to claim 1, wherein the collet has a circumferential groove in an area where the clamping jaws and the socket are connected.

14. A chuck comprising:
an attachment device adapted to attach the chuck to a motor-driven machine spindle;
a collet connected to the attachment device;
the collet having clamping jaws defining an insertion opening at an axial end face of the chuck facing away from the attachment device;
a sliding sleeve slidably connected to the collet and surrounding the clamping jaws, wherein the sliding sleeve is axially moveable in a first direction into a clamping position for clamping a shaft of a machining tool inserted into the insertion opening and in a second direction from the clamping position into a release position for releasing the shaft;
wherein between an inner circumference of the sliding sleeve and an outer circumference of the clamping jaws a mating pressure zone pair is provided that is comprised of a contact path conically tapering in an axial direction and comprised of counter pressure members that engage positively the contact path;
wherein the contact path is positioned at a slant angle relative to the axial longitudinal center of the collet, wherein the slant angle is so small that under expected operating forces of the chuck a self-locking action between the contact path and the counter pressure members is maintained at all times;
wherein the clamping jaws each have an outer circumferential surface provided with a recess;
wherein the counter pressure members are arranged in the recesses of the circumferential surfaces of the clamping jaws;
wherein the sliding sleeve has an inner circumferential wall forming the contact path;
wherein the counter pressure members are rolling elements;
wherein the recesses are connected to one another by a circumferential groove.

15. The chuck according to claim 14, wherein the recesses are radially drilled into the outer circumferential surface, respectively, and wherein a depth of the recesses is determined by a depth of the circumferential groove that has a width that is narrower is than a with of the recesses.

16. The chuck according to claim 14, wherein the recesses have a shape matched to a shape of the rolling elements.

17. A chuck comprising:
an attachment device adapted to attach the chuck to a motor-driven machine spindle;
a collet connected to the attachment device;
the collet having clamping jaws defining an insertion opening at an axial end face of the chuck facing away from the attachment device;
a sliding sleeve slidably connected to the collet and surrounding the clamping jaws, wherein the sliding sleeve is axially moveable in a first direction into a clamping position for clamping a shaft of a machining tool inserted into the insertion opening and in a second direction from the clamping position into a release position for releasing the shaft;

wherein between an inner circumference of the sliding sleeve and an outer circumference of the clamping jaws a mating pressure zone pair is provided that is comprised of a contact path conically tapering in an axial direction and comprised of counter pressure members that engage positively the contact path;

wherein the contact path is positioned at a slant angle relative to the axial longitudinal center of the collet, wherein the slant angle is so small that under expected operating forces of the chuck a self-locking action between the contact path and the counter pressure members is maintained at all times;

wherein the clamping jaws each have an outer circumferential surface provided with a recess;

wherein the counter pressure members are arranged in the recesses of the circumferential surfaces of the clamping jaws;

wherein the sliding sleeve has an inner circumferential wall forming the contact path;

wherein the recesses have a shape matched to a shape of the counter pressure members.

18. The chuck according to claim 17, wherein the collet has a socket and has an axial longitudinal area defined by the clamping jaws, wherein at least in the axial longitudinal area the collet is hollow and tubular, and wherein the clamping jaws are connected as monolithic parts to the socket.

19. The chuck according to claim 18, wherein the attachment device is provided on the socket.

20. The chuck according to claim 19, wherein the attachment device has a threaded bore provided in a free end of the socket.

21. The chuck according to claim 18, wherein the clamping jaws relative to an axial longitudinal center of the collet are pretensioned elastically in a radial outward direction.

22. The chuck according to claim 21, wherein the collet has a circumferential groove in an area where the clamping jaws and the socket are connected.

23. The chuck according to claim 17, wherein the counter pressure members are rolling elements.

24. The chuck according to claim 17, comprising a first stop defining the clamping position and a second stop defining the release position.

25. The chuck according to claim 24, wherein the first stop defining the clamping position is a transverse wall of the collet, wherein an end face of the sliding sleeve contacts the transverse wall in the clamping position.

26. The chuck according to claim 17, wherein the collet is comprised of hardened metal.

27. The chuck according to claim 17, wherein the slant angle is within a range of approximately 0.1 to 5 degrees.

28. The chuck according to claim 17, wherein the slant angle is between approximately 0.1 to 1 degrees.

* * * * *